US012647833B2

(12) United States Patent
Lal et al.

(10) Patent No.: US 12,647,833 B2
(45) Date of Patent: Jun. 2, 2026

(54) SYSTEMS AND METHODS FOR PROVIDING DYNAMIC GUARANTEED BANDWIDTH CONNECTION OVER MULTIPLE DOMAINS

(71) Applicant: Adeia Guides Inc., San Jose, CA (US)

(72) Inventors: Dhananjay Lal, Englewood, CO (US); Kamal J. Koshy, Aurora, CO (US)

(73) Assignee: Adeia Guides Inc., San Jose, CA (US)

( * ) Notice: Subject to any disclaimer, the term of this patent is extended or adjusted under 35 U.S.C. 154(b) by 229 days.

(21) Appl. No.: 18/216,076

(22) Filed: Jun. 29, 2023

(65) Prior Publication Data

US 2025/0008379 A1      Jan. 2, 2025

(51) Int. Cl.
| | |
|---|---|
| *H04W 28/20* | (2009.01) |
| *H04W 28/02* | (2009.01) |
| *H04W 84/12* | (2009.01) |

(52) U.S. Cl.
CPC ....... *H04W 28/20* (2013.01); *H04W 28/0268* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 7,567,512 | B1 * | 7/2009 | Minei | H04L 45/00 370/468 |
| 9,608,923 | B2 | 3/2017 | Ozer et al. | |
| 2002/0097726 | A1 * | 7/2002 | Garcia-Luna-Aceves | H04L 47/724 370/395.31 |

(Continued)

FOREIGN PATENT DOCUMENTS

| | | | | |
|---|---|---|---|---|
| KR | 20050062706 A | * | 6/2005 | ............ H04L 67/10 |

OTHER PUBLICATIONS

"Home Wi-Fi routers double as a public hotspot," [retrieved from URL: https://www.tanaza.com/tanazaclassic/blog/home-wi-fi-routers-double/], 5 pages (2023).

(Continued)

*Primary Examiner* — The Hy Nguyen
(74) *Attorney, Agent, or Firm* — HG LAW LLP

(57) ABSTRACT

Systems and methods for guaranteeing end-to-end QoS for wireless connections over a cable network are disclosed. Provisioning of on-demand guaranteed bandwidth connection over a cable network uses mechanisms from DOCSIS domain and Wi-Fi domain. A multi-domain orchestrator is implemented to control both domains. A bandwidth request is received from a client device connecting to a network service provider access point. The bandwidth request is updated for both domains with results of speed test of the wireless link if the speed test results are lower than the bandwidth request. The orchestrator and client device negotiate the bandwidth request using a three-way handshake over PacketCable Multimedia (PCMM) protocol. If the available bandwidth on either the DOCSIS or wireless link is less than the bandwidth request, the orchestrator generates a new bandwidth offer. If the client device accepts the offer, the orchestrator configures the DOCSIS and wireless links using their respective domain protocols to provision the connection with guaranteed end-to-end bandwidth.

19 Claims, 4 Drawing Sheets

(56)　　　　　References Cited

U.S. PATENT DOCUMENTS

| | | | | |
|---|---|---|---|---|
| 2006/0171315 A1* | 8/2006 | Choi | ..................... | H04L 47/20 |
| | | | | 370/395.2 |
| 2007/0286138 A1 | 12/2007 | Kaftan | | |
| 2011/0142017 A1 | 6/2011 | Coldren | | |
| 2011/0314086 A1 | 12/2011 | Finkelstein et al. | | |
| 2017/0214584 A1* | 7/2017 | Kanojia | ............... | G06F 3/0488 |
| 2020/0351717 A1* | 11/2020 | Bernstein | ............. | H04W 28/20 |
| 2023/0422091 A1* | 12/2023 | Li | ........................ | H04L 1/0038 |

OTHER PUBLICATIONS

"Meraki Traffic Shaper," [retrieved from URL: https://meraki.cisco.com/lib/pdf/meraki_datasheet_traffic_shaper.pdf], 2 pages (2023).

"OpenSync. It's the only way," [retrieved from URL: https://www.opensync.io/] 9 pages (2023).

"PacketCable Specification. Multimedia Specification. PKT-SP-MM-I07-151111," [retrieved from URL: https://community.cablelabs.com/wiki/plugins/servlet/cablelabs/alfresco/download?id=152f0820-cf0c-4a23-ada3-898746e490c2] 164 pages (2015).

"Spectrum Speed Boost," [retrieved from URL: https://www.spectrum.net/support/mobile/spectrum-mobile-speed-boost], 6 pages (2023).

"Use of PCMM to configure Non DOCSIS network devices," [retrieved from URL: https://www.cablelabs.com/wp-content/uploads/2014/04/60318-published.pdf], 2 pages (2023).

"What is iPerf/iPerf3?," [retrieved from URL: https://iperf.fr/] 3 pages (2002).

"Wi-Fi Certified WMM Programs," [retrieved from URL: https://www.wi-fi.org/discover-wi-fi/wi-fi-certified-wmm-programs] 3 pages (2023).

"Wireless QoS and Fast Lane—Cisco Meraki," [retrieved from URL: https://documentation.meraki.com/MR/WiFi_Basics_and_Best_Practices/Wireless_QoS_and_Fast_Lane] 4 pages (2022).

Banchs, A., et al., "Distributed weighted fair queuing in 802.11 wireless LAN," 2002 IEEE International Conference on Communications. Conference Proceedings. ICC 2002 (Cat. No.02CH37333), 5:3121-3127 (2002).

Hardesty, L., "Charter Taps its Wi-Fi to provide speed boost for its mobile customers," [retrieved from URL: https://www.fiercewireless.com/5g/charter-taps-its-wi-fi-provide-speed-boost-its-mobile-customers], 2 pages (2022).

PacketCable, WikipediA, [retrieved from https://en.wikipedia.org/wiki/PacketCable], 4 pages (2023).

Rideel, J., "Chapter 14: Multimedia Applications," [https://www.networkworld.com/article/2297189/chapter-14-multimedia-applications.html], 45 pages (2007).

Saad, E., et al., "Recent achievements in sensor localization algorithms," Alexandria Engineering Journal, 57: 4219-4228 (2018).

Smith, B., "What is Cable WiFi and How Does It Work?," [retrieved from URL: https://internet-access-guide.com/what-is-cable-wifi-and-how-does-it-work/], 17 pages (2019).

Chalouf et al., "A secured, automated, and dynamic end-to-end service level negotiation," Concurrency and Computation: Practice and Experience, 25(2):180-202 (2012).

Ma et al., "Access Point Centric Schedule for Dash Streaming in Multirate 802.11 Wireless Network," IEEE International Conference on Multimedia and Expo, pp. 1-6 (Jul. 14, 2014).

* cited by examiner

200

101

Service Provider App

Your current bandwidth is limited by your proximity to the Wi-Fi Access Point. You can increase your bandwidth by moving in this direction.

1

SYSTEMS AND METHODS FOR PROVIDING DYNAMIC GUARANTEED BANDWIDTH CONNECTION OVER MULTIPLE DOMAINS

FIELD OF INVENTION

Embodiments of the present disclosure relate to guaranteeing end-to-end QoS for client devices in wireless connections over cable networks.

SUMMARY

Customers enjoy and expect guaranteed end-to-end bandwidth from their network service providers. Such guarantees may be included in the service level agreement (SLA) of the customer's subscription with the network service provider. It can therefore be frustrating for customers (e.g., out-of-home subscribers) who connect to access points on-demand through the network service provider hotspots but are not guaranteed bandwidth. It can also be frustrating for customers (e.g., in-home subscribers) who knowingly or unknowingly offer their home Wi-Fi router for another subscriber to use as an access point on-demand but are not guaranteed bandwidth themselves. However, configuration of cable network systems for provisioning on-demand bandwidth on a dynamic basis over the cable network is restricted to the cable medium (DOCSIS domain), while mechanisms for guaranteeing bandwidth, such as QoS negotiation and validating resource availability, are restricted to the Wi-Fi medium (Wi-Fi domain).

Accordingly, methods and systems disclosed herein allow for guaranteeing end-to-end bandwidth on-demand in wireless connections over cable networks. A multi-domain orchestrator unifies the separate domains by facilitating communication between the DOCSIS domain and Wi-Fi domain in their respective formats (e.g., PacketCable Multimedia (PCMM) protocol for DOCSIS domain; Opensync or other suitable Wi-Fi connection management frameworks, for Wi-Fi domain). The orchestrator is operable to manage and configure the two domains to provision guaranteed bandwidth connection over two network links-a DOCSIS link (e.g., a wired link over a cable Hybrid Fiber-Coaxial (HFC) network) and a wireless link (e.g., a Wi-Fi link). The orchestrator receives a bandwidth request from a client device associated with an out-of-home subscriber. The orchestrator evaluates the quality of the wireless link (e.g., performs a speed test on the wireless link) and updates the parameters of the bandwidth request for both domains based on the speed test results. The client device and orchestrator engage in QoS negotiations for bandwidth, by way of a three-way handshake using an extension of PCMM signaling. The orchestrator assesses the available bandwidth over the DOCSIS and wireless links. If the orchestrator determines that the bandwidth request cannot be supported by the available bandwidth over the DOCSIS and/or wireless links, it dynamically generates a new bandwidth offer. If the client device accepts the new offer, the three-way handshake for QoS negotiation is complete. The orchestrator proceeds to configure the DOCSIS link to provision the agreed-upon bandwidth (e.g., by way of another three-way handshake, using PCMM protocol for cable network configuration) and configure the wireless link to provision the agreed-upon bandwidth (e.g., using weighted fair queuing (WFQ) or other suitable allocation scheme).

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
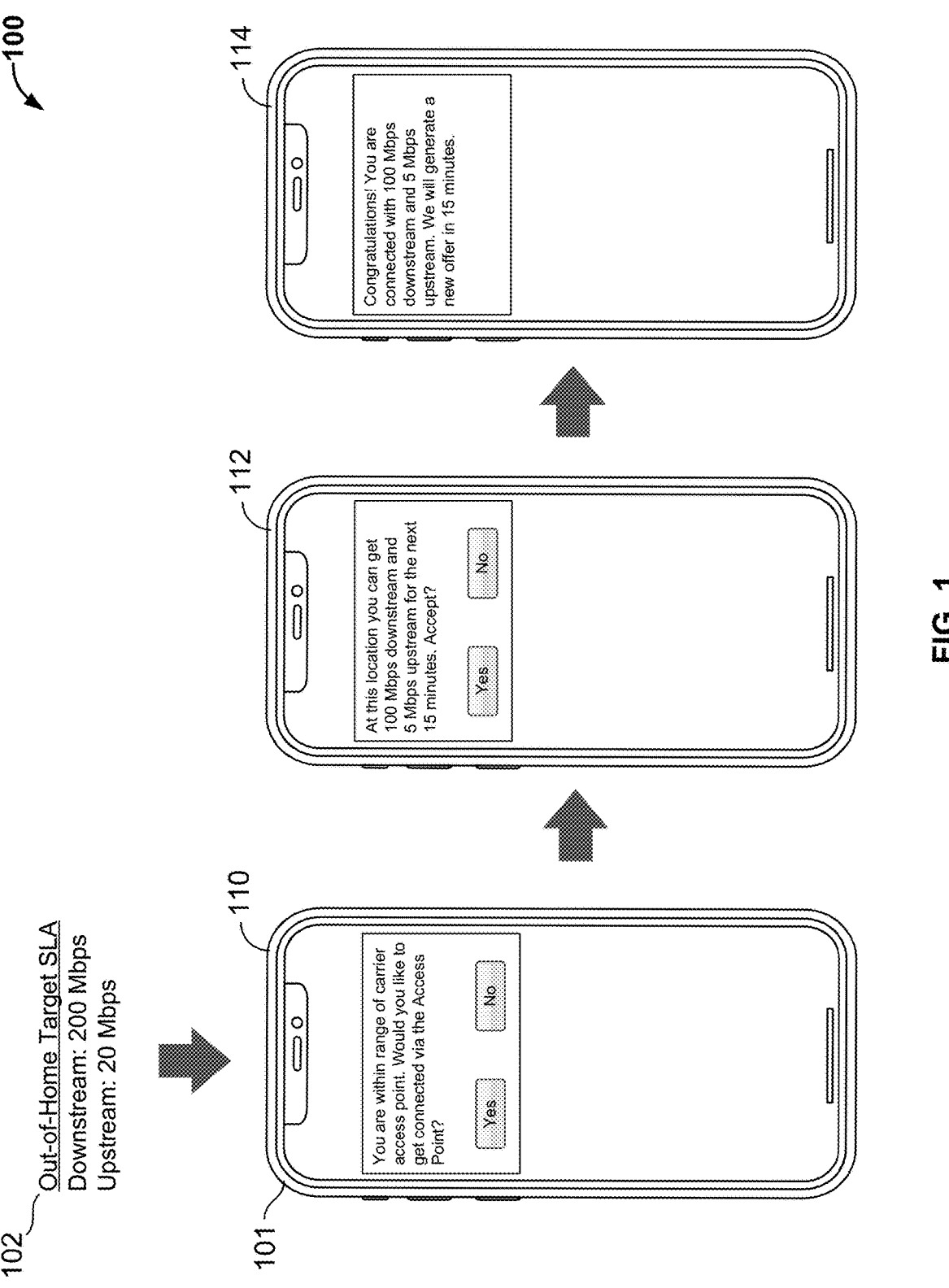
FIG. 1 depicts an illustrative scenario for guaranteeing on-demand bandwidth for wireless connections over a cable network, in accordance with some embodiments of the disclosure.

FIG. 1 depicts an illustrative scenario 100 for guaranteeing on-demand bandwidth for wireless connections over a cable network, in accordance with some embodiments of the disclosure. In an embodiment, a client device 101 is associated with an out-of-home user subscriber to a network service provider. The user subscriber is in-home when accessing resources of their network service provider through their own home (e.g., by connecting their client device 101 with a router belonging to the user). Conversely, the user subscriber is out-of-home when accessing resources of their network service provider through an access point outside of their home. For example, the out-of-home user subscriber may connect their client device 101 with a router belonging to another subscriber of the same network service provider, wherein the router acts as an access point. In another example, the out-of-home user subscriber may connect their client device 101 with a router or access point installed within a public router infrastructure of the same network service provider. Client device 101 can comprise any computing device suitable for connecting wirelessly to cable network devices (e.g., routers, access points). For example, a client device 101 can include, without limitation, smartphones, tablets, personal computers (PCs), laptop PCs, wearable devices (e.g., smart watches) and any other type of wireless and/or mobile equipment. Although the examples show provisioning and guaranteeing of bandwidth, methods and systems disclosed herein may be used to guarantee other QoS, such as latency, jitter, packet loss, and the like.

In an embodiment, the user has a service level agreement (SLA) associated with the user's subscription with their network service provider. The SLA defines a certain quality of network performance that the user expects or desires from their network service provider. In an embodiment, a target SLA 102 is the SLA for when the user is accessing out-of-home resources from the network service provider. For instance, the target SLA 102 can define the downstream and upstream speeds that the user expects or desires from their network service provider when client device 101 is within range of a network service provider access point (e.g., a router associated with another subscriber of the same network service provider or a public access point of the network service provider). In the example, the target SLA 102 for the user is 200 Mbps down/20 Mbps up, which is the QoS that client device 101 requests when it connects to one of the network service provider's Wi-Fi access points.

The target SLA may be predetermined, such as by terms and conditions of the user's subscription or user input. In another embodiment, the target SLA is determined based on various factors, such as user preferences, user history of resource consumption (in-home and/or out-of-home) or user activity on client device 101 (e.g., user frequently runs gaming applications on client device 101), the resource demand of an application on the client device 101 (e.g., user wishes to stream a video while connected to the access point; an application recommends a maximum percentage of packet loss for optimal performance, etc.), client device 101 information (e.g., hardware capabilities of the device, etc.), and the like. In an embodiment, the target SLA is stored in an authenticated profile associated with the user within client device 101 (such as in a mobile application associated with the network service provider that communicates with an application manager for provisioning network resources).

In the example, client device 101 connects with a router (e.g., router 326 of FIG. 3) belonging to another subscriber (e.g., in-home subscriber) or to a public router infrastructure of the same network service provider as the out-of-home subscriber. In an embodiment, in addition to or alternative to serving in-home traffic, the router acts as a network provider access point (e.g., CableWifi access point) which broadcasts a public Wi-Fi Service Set Identifier (SSID) and becomes a public hotspot, allowing out-of-home subscribers to connect with the router and request provisioning of QoS resources from the network service provider. As will be described below, the out-of-home subscriber can negotiate for and be guaranteed end-to-end QoS resources, such as a particular upstream and/or downstream bandwidth, over the cable network.

According to some embodiments, negotiation, configuration, and provisioning of on-demand guaranteed bandwidth for the out-of-home subscriber are facilitated by a multi-domain orchestrator ("orchestrator") associated with the network service provider. Configuration of cable network systems to provision bandwidth on a dynamic basis is restricted to the DOCSIS domain, while functionalities for QoS negotiation and resource availability validation are restricted to the Wi-Fi domain. However, both domains should be engaged in order to provision guaranteed end-to-end bandwidth connection, as the connection includes a cable domain portion and a Wi-Fi domain portion. For example, the cable domain portion of the connection may be a DOCSIS link (e.g., a cable network link; e.g., a wired link over an HFC network) between the cable modem and the Cable Modem Termination System (CMTS) located at the cable headend of the network service provider. The Wi-Fi domain portion may be the wireless link (e.g., a Wi-Fi network link, also referred to as Wi-Fi link) between the client device 101 and the router (such as the router belonging to another subscriber). The orchestrator communicates with respective orchestration entities (e.g., application managers and policy servers, described in further detail in FIG. 3) for both DOCSIS domain and Wi-Fi domain to perform on-demand configuration of guaranteed bandwidth connection over the links of both domains. Thus, the orchestrator connects the two domains to allow for client device 101 to negotiate with the network service provider for QoS and be provisioned guaranteed end-to-end bandwidth. Although the examples describe provisioning guaranteed resources over cable networks (e.g., DOCSIS domain), methods and systems disclosed herein may be implemented on the satellite domain, fiber domain, 5G domain, or other suitable domains or technology mediums which guarantee or provision bandwidth over a LAN site.

At step 110 of FIG. 1, client device 101 comes within range of a network service provider access point. For example, client device 101 may scan for wireless network SSIDs that are available at its location and request to connect to a network associated with the network service provider. Alternatively or in conjunction, the orchestrator may determine that the client device 101 is within range based on location data of the client device 101 and of the access point. Upon coming within range of the access point, client device 101 receives a notification (e.g., a push notification) asking whether the user wants the network service provider to provision network resources. If the user accepts, QoS negotiations begin between the client device 101 and the orchestrator.

In an embodiment, the QoS negotiation includes a three-way handshake over the cable network (e.g., by extension of PacketCable Multimedia (PCMM) signaling and configuration in cable networks). In the QoS negotiation, client device 101 (e.g., by way of a network service provider mobile application which communicates with the orchestrator) sends a bandwidth request that includes the target SLA to the orchestrator, which relays the bandwidth request to both domains. Since the wireless link is prone to transmission errors, the orchestrator evaluates the quality of the wireless link (e.g., by way of a speed test). The orchestrator may update the parameters of the bandwidth request based on its evaluation of the quality of the wireless link. This updated bandwidth request is passed through as input in both domains, when the orchestrator evaluates the available bandwidth over the DOCSIS link and wireless link. If the bandwidth request cannot be provisioned based on the available bandwidth of the DOCSIS and wireless links, then the orchestrator generates a new offer with a new QoS. If client device 101 accepts the new offer, the three-way handshake is complete and guaranteed bandwidth will be provisioned under the accepted QoS.

In an embodiment, upon accepting the notification for provisioning of network resources, client device 101 sends the bandwidth request comprising the target SLA 102 to the orchestrator. In some embodiments, the bandwidth request also includes a time period (for example, a desired session length for which the user wants to be provisioned guaranteed bandwidth). Upon receiving the bandwidth request, the orchestrator evaluates the quality of the wireless link. For example, the orchestrator instructs an appropriate orchestration entity (discussed in further detail in FIG. 3) of the Wi-Fi domain to perform a speed test of the wireless link. The speed test results are compared with the target SLA. The target SLA is used as input in provisioning the cable network bandwidth. If the speed test results are lower than the target SLA, the speed test results replace the target SLA in subsequent bandwidth requests (e.g., in messages subsequently relayed and processed through system components of each domain; e.g., for each network link, the bandwidth request parameters are updated with the speed test values).

In an embodiment, the orchestrator determines (e.g., by way of communicating with the orchestration entities of each domain) whether the DOCSIS and Wi-Fi networks can provision the requested bandwidth based on an evaluation of the available bandwidth for each of the DOCSIS link and wireless link. In an embodiment, the available bandwidth of each link is determined based on subtracting the used capacity of each link from the maximum capacity of the respective link. In some embodiments, the orchestrator also reserves an unallocated proportion of bandwidth (e.g., thereby further reducing the available bandwidth of the links) if future connection requests from additional users are expected during the time period of the user's request. When the orchestrator determines that the available bandwidth (of either or both domains) differs from the requested bandwidth (for example, the available bandwidth over at least one of the two links is insufficient to provision the requested bandwidth), the orchestrator generates a new offer comprising the bandwidth that can actually be offered. For example, the new offer may be the lower of the available bandwidth on the DOCSIS link or on the wireless link.

In some embodiments, the new offer may also include a time period (e.g., a length of time for which the proposed bandwidth can be provisioned). The orchestrator may determine the time period based on variations or patterns in the historical bandwidth usage (downstream and/or upstream) of the wireless link and of the DOCSIS link over a period of time (e.g., within an hour, on weekdays compared to weekends, etc.). In an embodiment, the orchestrator determines a coherent time (e.g., stable time) during which the traffic demand shows relative stability. In some embodiments, the orchestrator can estimate the number of expected new connection requests during the time period, based on historical arrival rates of new connection requests. The orchestrator can reserve an unallocated proportion of bandwidth for potential new connection requests based on the number of expected new connections during the time period.

In the example, the user's target SLA 102 is 200 Mbps down/20 Mbps up. Suppose the speed test results yield the same or higher values (e.g., 200 Mbps down/20 Mbps up). In this situation, the original target SLA 102 values are used in the bandwidth request for both domains. However, suppose the speed test results yield lower values (e.g., 150 Mbps down/10 Mbps up). In that situation, the target SLA values will be replaced by the speed test results for both domains.

In conjunction or alternatively, the orchestrator evaluates the quality of the wireless link based on signal strength data of the wireless signal from the router to the client device 101 and makes recommendations to improve the wireless signal quality. For example, client device 101 collects data on the wireless signal it receives from the access point (e.g., received signal strength indicator (RSSI), angle-of-arrival (AoA) data, etc.). If the signal strength values and/or the speed test values are each below a threshold, the orchestrator determines that the wireless signal from the access point to the client device 406 is fading and the reduced bandwidth is a result of link layer retransmissions. The threshold can be the target SLA value(s), or other predetermined value(s), for instance, based on demands of the application running on client device 101 (e.g., streaming video), user profile history or preferences, etc. The orchestrator may send client device 101 a notification providing navigation information (e.g., cardinal direction, location coordinates, etc.) to guide the user to move to another location to increase received signal strength and wireless speed.

The orchestrator also estimates the available bandwidth over both DOCSIS and wireless links. Suppose the orchestrator determines that based on the bandwidth usage, the lowest bandwidth available over either the DOCSIS link and/or wireless link is 100 Mbps down/5 Mbps up. Moreover, such bandwidth may be available for the next 15 minutes. Because the bandwidth request cannot be supported by the available bandwidth over the links, the orchestrator generates a new offer comprising the bandwidth that can actually be provisioned over both links (e.g., 100 Mbps down/5 Mbps up).

At step 112, client device 101 receives the new bandwidth offer. If the user accepts, the three-way handshake for QoS negotiation is complete, and orchestrator proceeds to configure the DOCSIS link (e.g., by way of another three-way handshake using PCMM signaling for cable network configuration) and the wireless link (e.g., using weighted fair queuing (WFQ) or other suitable allocation algorithm). Configuration of the DOCSIS and wireless links is discussed in further detail in FIG. 4.

At step 114, the client device 101 is provisioned with on-demand guaranteed bandwidth. In an embodiment, the guaranteed bandwidth connection is provisioned for a time period. The system terminates the guaranteed bandwidth connection when the time period expires. In conjunction or in the alternative, the guaranteed bandwidth connection terminates when the user moves their location (e.g., resulting in the client device 101 receiving a wireless signal with reduced strength). In another embodiment, when the time period approaches its expiration, the client device 101 and orchestrator renegotiate for continuing the guaranteed bandwidth connection (e.g., renewing the session). In some embodiments, the original SLA is used in the bandwidth request during renewal. In another embodiment, the updated SLA from the previous session is used in the bandwidth request during renewal. The orchestrator adjusts (e.g., upgrade or downgrade) the QoS parameters of the bandwidth request based on changes to the bandwidth quality over the DOCSIS and wireless links. The orchestrator and client device 101 then proceed to renegotiate the QoS of the bandwidth request. When an agreement is reached, the orchestrator reconfigures the DOCSIS link and wireless link to provision bandwidth with the renegotiated QoS.

Figure 2:
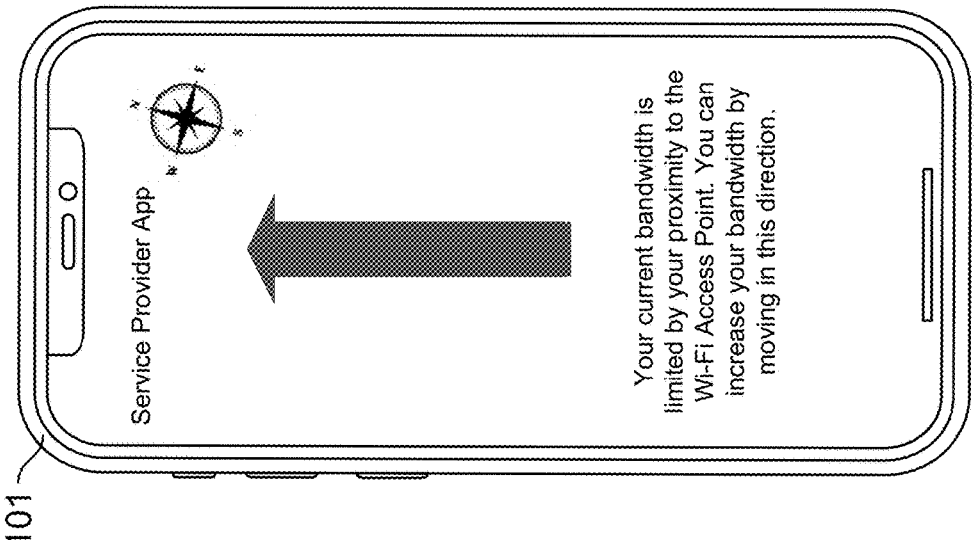
FIG. 2 depicts another illustrative scenario for guaranteeing on-demand bandwidth for wireless connections over a cable network, in accordance with some embodiments of the disclosure.

FIG. 2 depicts another illustrative scenario 200 for guaranteeing on-demand bandwidth for wireless connections over a cable network, in accordance with some embodiments of the disclosure. As described above, when client device 101 sends the bandwidth request to the orchestrator, the orchestrator evaluates the quality of the wireless link by performing a speed test (e.g., between the access point and client device 101). In conjunction or in the alternative, the orchestrator determines whether the wireless signal strength is too weak for the user. For example, the client device 101 may be too far from the access point or is in a location where the signal is reduced or obstructed, and so forth. In an embodiment, the orchestrator collects signal strength data (e.g., received signal strength indicator (RSSI) data or angle of arrival (AoA) data of the wireless signal received by client device 101, e.g., by way of a mobile antenna, etc.) from the client device 101. When the speed test results and/or the RSSI of the signal received from the access point by the client device 101 are below a respective threshold (such as the target SLA value(s), or other suitable predetermined signal strength threshold), the orchestrator may determine that the wireless signal to client device 101 is fading, and the reduced bandwidth may be due to link layer retransmissions. The orchestrator may transmit a notification to client device 101 to provide navigation guidance (such as cardinal direction, location coordinates, elevation, etc.) to the user to move to another location to receive the strongest (or stronger) wireless signal from the access point. In an embodiment, the orchestrator performs the speed test continuously and/or collects RSSI data of the signal from the access point to the client device 101 continuously (e.g., continuously providing guidance notifications to the user as the user relocates and moves closer to the access point) until the speed test results and/or the RSSI values are above a respective threshold. Then, the orchestrator proceeds to negotiate with client device 101 for guaranteed bandwidth.

In some embodiments, the orchestrator performs the speed test and/or collects the RSSI data periodically (e.g., every few minutes) during the provisioning of guaranteed bandwidth to check if client device 101 has relocated such that the client device 101 is receiving reduced signal (e.g., client device 101 is out of range of the hotspot). The orchestrator may then notify the user to relocate (e.g., closer to the access point) or terminate the current guaranteed bandwidth connection.

Figure 3:
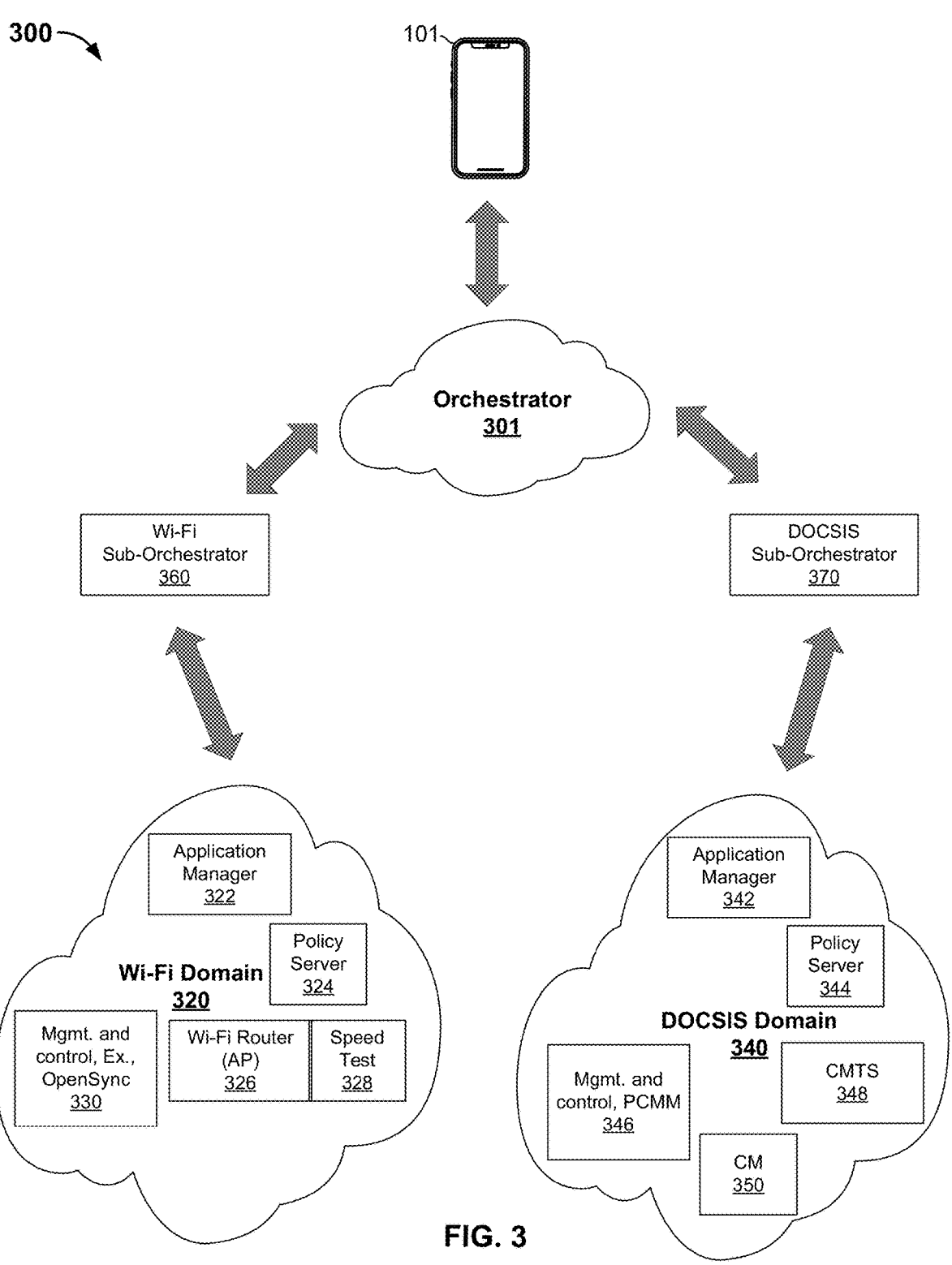
FIG. 3 depicts an example environment for implementation of a system for guaranteeing on-demand bandwidth for wireless connections over a cable network, in accordance with some embodiments of the disclosure.

FIG. 3 depicts an example environment 300 for implementation of a system for guaranteeing on-demand bandwidth for wireless connections over a cable network, in accordance with some embodiments of the disclosure. In an embodiment, the environment comprises orchestrator 301, client device 101, Wi-Fi domain 320, and DOCSIS domain 340. Wi-Fi domain 320 further comprises application manager 322, policy server 324, and router 326. DOCSIS domain 344 further comprises application manager 342, policy server 344, cable modem termination system (CMTS) 348, and cable modem (CM) 350. In an embodiment, the system further comprises Wi-Fi sub-orchestrator 360 and DOCSIS sub-orchestrator 370.

According to an embodiment, orchestrator 301 is a single unified orchestrator (e.g., a multi-domain orchestrator) that orchestrates and performs on-demand configuration of guaranteed bandwidth for both domains. Orchestrator 301 may be the sole orchestration entity and controls functionalities of both domains. In another embodiment, each domain has its own dedicated orchestrator (e.g., Wi-Fi sub-orchestrator 360 for Wi-Fi domain 320; DOCSIS sub-orchestrator 370 for DOCSIS domain 340) in place of single orchestrator 301, wherein the two dedicated domain orchestrators communicate and coordinate directly with each other when calculating, configuring, and provisioning end-to-end bandwidth within their respective domain. In yet another embodiment, and as shown in the example, the system may include all of the unified orchestrator 301 and the separate dedicated sub-orchestrators 360, 370 for each domain. In the embodiment, the sub-orchestrators 360, 370 directly control the functionalities of their respective domain, while orchestrator 301 coordinates the operations between the two domains and interfaces between the sub-orchestrators 360, 370 and client device 101.

Orchestrator 301 (and/or sub-orchestrators 360, 370) manages and facilitates communication between the respective orchestration entities that serve each domain. In an embodiment, an application manager 342 and policy server 344 are PacketCable Multimedia (PCMM)-based orchestration entities which serve the DOCSIS domain and perform DOCSIS-based functionalities. In an embodiment, application manager 322 and policy server 324 are Wi-Fi-based orchestration entities which perform Wi-Fi equivalent and/or corresponding functionalities as those of application manager 342 and policy server 344. In another embodiment, other logical entity(s) of the Wi-Fi domain may be implemented to perform the Wi-Fi based functionalities of application manager 322 and/or policy server 324. Orchestrator 301 manages and controls the application manager and policy server (or other suitable orchestration entity(s)) of each domain in their respective formats. For example, orchestrator 301 manages and controls the Wi-Fi domain 320 using Wi-Fi connection managers, such as Opensync, or other suitable Wi-Fi orchestration mechanisms. Orchestrator 301 manages and controls the DOCSIS domain 340 using PacketCable Multimedia (PCMM), or other suitable cable network management mechanisms. Orchestrator 301 may directly communicate with client device 101, or indirectly (e.g., via application manager 322, 342 of the respective domains or e.g., via dedicated sub-orchestrators 360, 370 of the respective domains).

According to an embodiment, client device 101 is associated with an out-of-home subscriber user to a network service provider. For example, client device 101 connects with router 326, which may belong to another subscriber of the same network provider as the out-of-home subscriber. Client device 101 can comprise any computing device suitable for connecting wirelessly to cable network devices (e.g., routers, access points). For example, a client device 101 can include, without limitation, smartphones, tablets, personal computers (PCs), laptop PCs, wearable devices (e.g., smart watches) and any other type of wireless and/or mobile equipment.

According to an embodiment, application managers 322, 342 of each domain are operable to interface (e.g., via orchestrator 301, and/or via dedicated sub-orchestrators 360, 370) with clients (e.g., client device 101) and maintain application-level state. Application managers 322, 342 coordinate client application requests, such as configuration requests from client device 101 or orchestrator 301 (e.g., PCMM requests for DOCSIS domain 340; Wi-Fi bandwidth configuration requests for Wi-Fi domain 320). Application managers 322, 342 also authenticate any incoming requests from clients. Additionally, application manager 322, 342 communicates with the respective policy server 324, 344 of the domain and is the device responsible for applying service policies (e.g., which are identified, verified, and enforced by the respective policy server 324, 344). According to an embodiment, policy servers 324, 344 are operable to handle service requests from application managers 322, 342, respectively, and convert the requests into resource policy requests used to set up QoS resources. Policy servers 324, 344 can serve as a proxy between application managers and network devices (e.g., between application manager 322 and router 326 in Wi-Fi domain 320; between application manager 342 and CMTS 348 in DOCSIS domain 340) and monitors all messages between such devices. Policy servers 324, 344 apply policy rules to requests (e.g., bandwidth configuration requests) received from the application managers 322, 342. For example, policies can include limits on the number of PCMM gates allocated to a subscriber, limits on the types of QoS available to a subscriber, limits on which applications the policy servers 324, 344 may accept, limits on the impact of service on network devices (such as CMTS 348), and so forth. Policy server 344 sends QoS set-up messages to CMTS 348. and policy server 324 sends Wi-Fi bandwidth configuration instructions including bandwidth allocation scheme to router 326. Policy servers 324, 344 also collect data from various network devices (e.g., bandwidth data from CMTS 348 and router 326) to check against policies associated with the subscriber and/or network service provider (e.g., whether the bandwidth request can be provisioned based on the available bandwidth over each domain).

According to an embodiment, cable modem (CM) 350 is operable to provide cable internet to client device 101. CM 350 may be associated with the network service provider to which the user (of client device 101) subscribes. The DOCSIS link (e.g., cable portion of the guaranteed bandwidth) comprises the link between CMTS 348 and CM 350 (for instance, the wired link over an HFC network of the network service provider).

According to an embodiment, router 326 is operable to act as a Wi-Fi access point of the network service provider. The wireless link (e.g., Wi-Fi portion of the guaranteed bandwidth) comprises the link between router 326 and client device 101. Router 326 can broadcast a public SSID and become a public hotspot of the network service provider, allowing out-of-home subscribers to connect with the router 326 and request provisioning of QoS resources from the network service provider. In other embodiments, router 326 can be any wireless access point or networking device on the Wi-Fi domain tethered to a cable network, including but not limited to extenders, boosters, repeaters, or other suitable devices for broadcasting a public SSID of the network service provider. In an embodiment, router 326 may be associated with another subscriber of the same network service provider as the user of client device 101 (e.g., the user is an out-of-home subscriber). In another embodiment, router 326 is part of a shared public router infrastructure of the network service provider. Router 326 also evaluates the quality of the wireless link between itself (router 326) and client device 101, by performing a speed test 328. In another embodiment, a gateway or modem-router is used, combining the functions of the router 326 and cable modem 350 in a single device.

According to an embodiment, cable modem termination system (CMTS) 348 is networking equipment operable to implement DOCSIS protocol and connect CM 350 over the cable network. CMTS 348 resides at the cable head-end of the network service provider.

In other embodiments, DOCSIS domain 340 may be replaced with other network domains, such as satellite domain, fiber domain, 5G domain, or other suitable domains or technology mediums which guarantee or provision bandwidth over a LAN site.

Figure 4:
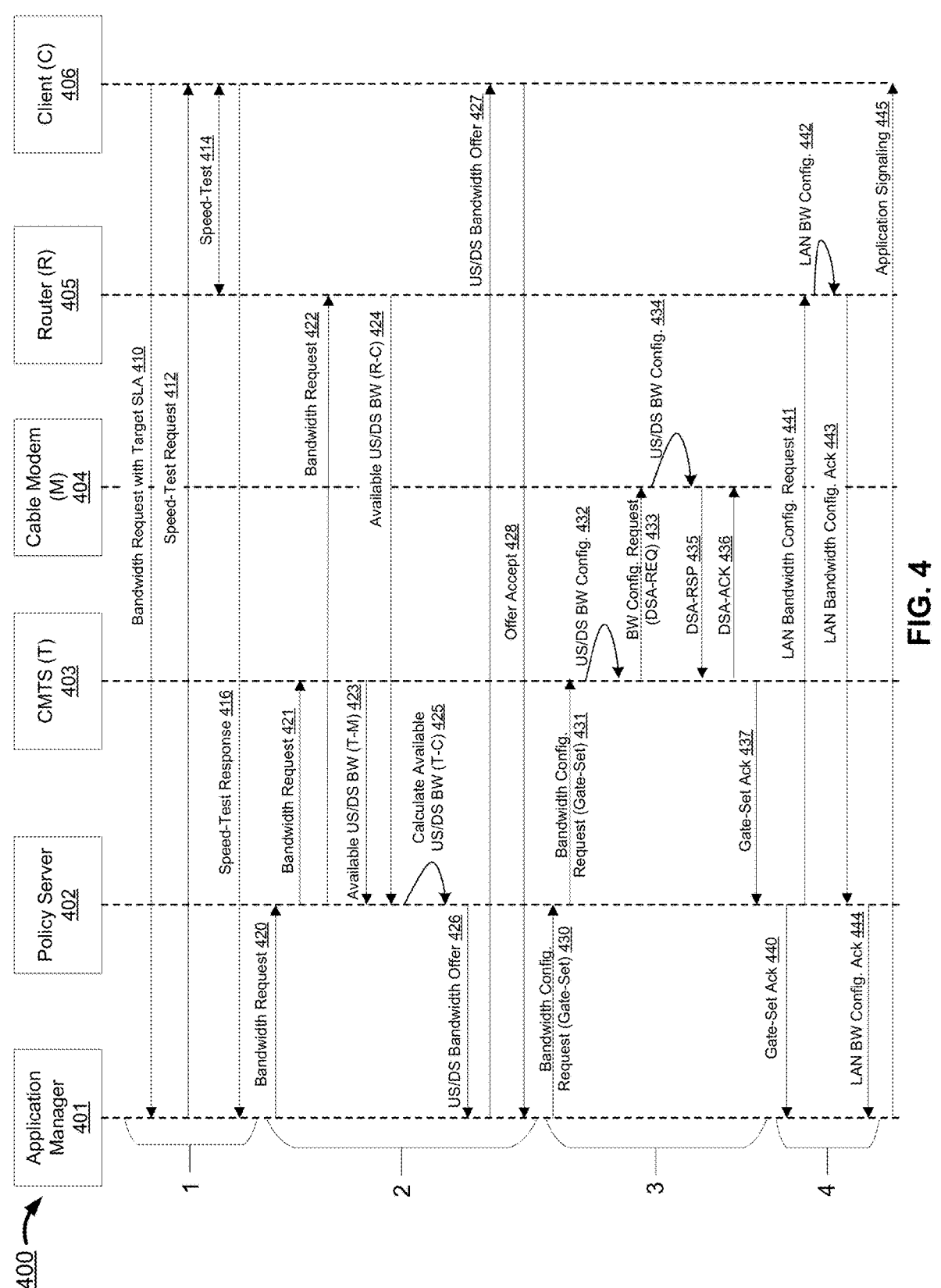
FIG. 4 depicts a system sequence diagram of an example process for guaranteeing on-demand bandwidth for wireless connections over a cable network, in accordance with some embodiments of the disclosure.

FIG. 4 depicts a system sequence diagram of an example process 400 for guaranteeing on-demand bandwidth for wireless connections over a cable network, in accordance with some embodiments of the disclosure. In an embodiment, the system comprises application manager 401, policy server 402, cable modem termination system (CMTS) 403 (previously referenced as CMTS 348 of FIG. 3), cable modem 404 (previously reference as cable modem 350 of FIG. 3), router 405 (previously referenced as router 326 of FIG. 3), and client device 406 (previously referenced as client device 101 of FIG. 1). Application manager 401, policy server 402, CMTS 403, cable modem 404, and router 405 may be associated with a network provider that provisions wireless connection to client device 406. A DOCSIS link comprises a link between CMTS 403 and cable modem 404 (e.g., a CMTS-CM link). A wireless link comprises a link between router 405 and client device 406 (e.g., a Wi-Fi router-wireless device link, also referred to as a Wi-Fi link). The DOCSIS and Wi-Fi domains of the system may be controlled by the unified orchestrator 301. In the example, a common application manager 401 and/or a common policy server 402 serves both domains and are controlled by unified orchestrator 301 (or by their respective dedicated orchestrators 360, 370). In another embodiment, a separate application manager (e.g., application managers 322, 342) and/or separate policy server (e.g., policy servers 324, 344) serves each of the domains, and the unified orchestrator 301 and/or sub-orchestrators 360, 370 coordinates, manages, and facilitates communication between the respective application managers and/or policy servers and/or other system components or other orchestration entities for each domain. For instance, the unified orchestrator 301 sends messages to the application manager and/or policy server in each domain in their respective format (e.g., PCMM, or other suitable cable network orchestration mechanism, for DOCSIS domain; OpenSync, or other suitable Wi-Fi orchestration mechanism, for the Wi-Fi-domain). Router 405 comprises a Wi-Fi router, such as a home router serving as an access point to broadcast a public Wi-Fi SSID, or any other suitable device for broadcasting wireless signals and facilitating wireless connections or otherwise serve as a Wi-Fi hotspot. Client device 406 comprises an out-of-home subscriber wireless device, such as a mobile device associated with the network provider (e.g., a user of the client device 406 subscribes to the network provider) but is not directly associated with router 405. For instance, router 405 may belong to another user subscriber of the same network provider. In another instance, router 405 may belong to a shared public router infrastructure of the same network provider. Wi-Fi radio is broadcast from router 405 and is provisioned by the network service provider to accept client requests from out-of-home subscriber devices such as client device 406.

According to some embodiments, in Phase 1 of FIG. 4, orchestrator 301 receives a bandwidth request from client device 406. Orchestrator 301 evaluates the quality of the wireless link (e.g., performs a speed test on the wireless link) and updates the parameters of the bandwidth request for both domains based on the speed test results. In Phase 2, orchestrator 301 (e.g., by way of application manager 401) and client device 406 engage in QoS negotiations, by way of a three-way handshake using an extension of PacketCable Multimedia (PCMM) signaling. The bandwidth request of client device 406 is passed to policy server 402. Policy server 402 assesses the available bandwidth over the DOCSIS and wireless links and, if the bandwidth request cannot be supported, dynamically generates a new bandwidth offer. If client device 406 accepts the new offer, the three-way handshake for QoS negotiation is complete. In Phase 3, orchestrator 301 instructs system components to configure the DOCSIS link to provision the agreed-upon bandwidth (e.g., by way of another three-way handshake, using PCMM signaling for cable network configuration). In Phase 4, orchestrator 301 instructs system components to configure the wireless link to provision the agreed-upon bandwidth (e.g., using weighted fair queuing (WFQ) or other suitable allocation scheme).

At step 410 in Phase 1 of FIG. 4, client device 406 (e.g., by way of a service provider mobile application which communicates with application manager 401) sends a bandwidth request to both DOCSIS and Wi-Fi domains (e.g., to common application manager 401 or separate dedicated application managers for each domain). In an embodiment, sending the bandwidth request may be initiated automatically. For instance, the bandwidth request may be automatically sent upon detection of client device 406 being within range of a network service provider access point and/or joining the network via the access point, upon user accepting an invitation for connection (e.g., step 110 of FIG. 1), etc. The bandwidth request includes a target service level agreement (SLA), which defines a certain quality of network performance that a client (such as client device 406) expects or desires from the network service provider. For example, the target SLA may include desired parameters for a particular QoS on-demand service, such as downstream and/or upstream bandwidth for out-of-home use (e.g., connecting to and using a cable network Wi-Fi access point which does not belong to the user associated with client device 406), or other suitable resource on demand. For instance, the target SLA can specify certain levels or ranges of downstream and upstream bandwidth, such as 200 Mbps down/20 Mbps up. The target SLA can also specify a desired time period (e.g., desired session length) for the desired QoS, such as 200 Mbps down/20 Mbps up for 20 minutes.

At step 412, upon receiving the bandwidth request, application manager 401 evaluates the quality of the wireless link, which may be prone to transmission errors. The quality estimation of the wireless link is used as input for provisioning the cable network and Wi-Fi bandwidth. In the example, orchestrator 301 evaluates (e.g. via application manager 401) the quality of the wireless link by estimating the maximum capacity (downstream and/or upstream) over the Wi-Fi network to the client device 406. Application manager 401 directs router 405 to perform a speed test between itself (e.g., router 405) and client device 406.

At step 414, router 405 conducts the speed test, which is used to determine the maximum downstream/upstream bandwidths that can be achieved over the wireless link.

At step 416, application manager 401 receives the speed test results. Application manager 401 compares the speed test results with the target SLA and updates the target SLA if certain conditions are met. For example, if the speed test values are lower than the target SLA values, then application manager 401 replaces the target SLA for both domains with the speed test values as parameters (e.g., when relaying the target SLA in subsequent bandwidth requests to other system components such as common policy server 402, or respective policy servers of each domain if separate) for the remainder of the process. For example, if the target SLA requested 200 Mbps down/20 Mbps up, but the speed test yields 150 Mbps down/10 Mbps up, then client device 406 will update the target SLA values as 150 Mbps down/10 Mbps up in subsequent bandwidth requests to system components of both DOCSIS and Wi-Fi domains. If the target SLA values are lower than the speed test results, then the original target SLA values will be used in subsequent bandwidth requests relayed through both domains. For example, if the target SLA requested 200 Mbps down/20 Mbps up, and the speed test yields 250 Mbps down/25 Mbps up, then the original target SLA values (e.g., 200 Mbps down/20 Mbps up) will be used in subsequent bandwidth requests for both domains.

In another embodiment, orchestrator 301 receives RSSI data from client device 406 indicating the wireless signal strength from router 405 to client device 406. In conjunction or in the alternative, orchestrator 301 calculates the angle-of-arrival (AoA) of the signal. If the RSSI value and/or the speed test values are below a threshold, orchestrator 301 may determine that the wireless signal to the client device 406 is fading and the reduced bandwidth is a result of link layer retransmissions. Orchestrator 301 may send (e.g., via application manager 401) a notification to client device 406 providing navigation information (e.g., cardinal direction, location coordinates, etc.) to guide the user to move to another location to increase received signal strength and wireless signal speed. The navigation information may be based on various data, such as AoA calculations of the wireless signal, location data of client device 406 and router 405, environmental data (e.g., presence of nearby obstructions such as buildings, etc.), and the like.

At step 420 in Phase 2 of FIG. 4, application manager 401 sends to policy server 402 the bandwidth request with the parameters determined from the previous step of estimating the quality of the wireless link (e.g., using the target SLA bandwidth or the lower of the target SLA bandwidth or speed test results). Client device 406 and application manager 401 may now negotiate the parameters of the bandwidth request over the wireless and DOCSIS links by way of a three-way handshake (e.g., steps 420, 426, and 428), based on estimating the capacity (e.g., available bandwidth) of both links. In an embodiment, the three-way handshake comprises an extension of PCMM signaling in cable network configuration for provisioning bandwidth on a dynamic basis. At steps 421 and 422, policy server 402 queries network equipment for each domain for the available bandwidth for each link. According to an embodiment, the available bandwidth of a link is the free (e.g., unused) capacity of the link currently on the network. The available bandwidth can be measured as the difference between the maximum link capacity and the used capacity.

For the DOCSIS domain, at step 421, policy server 402 queries CMTS 403 for the available bandwidth (e.g., in downstream/upstream directions) for the DOCSIS link (e.g., CMTS 403-CM 404 link) and determines whether the available bandwidth on the DOCSIS link can support provisioning of the target SLA of the bandwidth request.

For the Wi-Fi domain, at step 422, policy server 402 queries router 405 for the available bandwidth (e.g., downstream/upstream) for the wireless link (e.g., Wi-Fi router 405-client device 406 link) to determine whether the available bandwidth on the wireless link can support provisioning of the target SLA of the bandwidth request.

In some embodiments, the average available bandwidth is used to determine whether a network link can support provisioning of the target SLA. The available bandwidth over the DOCSIS link and/or the available bandwidth over the wireless link is calculated over a time period to determine the average available bandwidth for the respective link. Further in the embodiment, the average available bandwidth for each link is calculated periodically to ensure the most current averages are determined and communicated to policy server 402. In yet another embodiment, the available bandwidth is reduced by multiplying it by a fractional value constant, to ensure that another client device requesting on-demand bandwidth (e.g., from the same hotspot associated with router 405) does not affect peak or bursty traffic.

At step 423, CMTS 403 responds to the policy server 402 query with the available bandwidth over the DOCSIS link.

At step 424, router 405 responds to the policy server 402 query with the available bandwidth over the wireless link.

Although the example shows a particular sequence of communications between policy server 402 and CMTS 403 and between policy server 402 and router 405 in determining the available bandwidth over each link (e.g., steps 421, 422, 423, and 424), it should be understood that the communication between policy server 402 and CMTS 403 and the communication between policy server 402 and router 405 can occur in parallel or in various orders.

At step 425, policy server 402 uses the available bandwidths of the DOCSIS link and the wireless link to calculate the available end-to-end bandwidth, which policy server 402 uses to determine whether the parameters of the target SLA of the bandwidth request can be provisioned over the DOCSIS and Wi-Fi networks. In the example, the available bandwidth of each link is calculated by subtracting the used capacity of each link from the maximum capacity of the respective link. Policy server 402 may also set aside an unallocated proportion of bandwidth to reserve for potential future connections (e.g., between router 405 and additional client devices) expected within the time period that client device 406 will be provisioned guaranteed bandwidth. The reserved unallocated proportion of bandwidth may be calculated based on various factors, such as historical arrival rate of new connection requests or other traffic patterns over a period of time. Policy server 402 compares the available bandwidth of each link with the target SLA of the bandwidth request. If policy server 402 determines that the requested bandwidth cannot be provided over either of the links (e.g., because the available bandwidth of at least one of the links is less than the target SLA), policy server 402 generates a new bandwidth offer. In an embodiment, the new bandwidth offer comprises the bandwidth that can actually be provided (e.g., the minimum of the available bandwidths for each direction over either of the two links), which will be the new end-to-end bandwidth if accepted by the user.

In conjunction or alternatively, the new offer includes a time period (e.g., a session length) for which the resources can be provisioned. For example, the target SLA of the original bandwidth request may include a desired time period for guaranteed bandwidth (e.g., 200 Mbps down/20 Mbps up for 30 minutes). However, policy server 402 may determine that guaranteed bandwidth can be provisioned at different speeds than requested (e.g., 100 Mbps down/5 Mbps up) and/or for a different time period (e.g., 15 minutes). The time period may be predetermined or based on variation in the historical bandwidth usage (downstream and/or upstream) of the DOCSIS link and/or wireless link over time (e.g., within an hour, on weekdays compared to weekends, etc.), or other traffic patterns. In an embodiment, policy server 402 determines a coherent time (e.g., stable time) during which the traffic demand shows relative stability.

At step 426, policy server 402 sends the new bandwidth offer to application manager 401.

At step 427, application manager 401 relays the new bandwidth offer to client device 406.

At step 428, if the subscriber associated with client device 406 accepts the offer, the three-way handshake for QoS negotiation is complete and the process continues to set up the agreed-upon end-to-end bandwidth in Phase 3. If the subscriber declines, the process ends. In another embodiment, if the subscriber declines the new bandwidth offer, the negotiation continues by iterating through Phase 1 and Phase 2 until the subscriber accepts another bandwidth offer.

At step 430 in Phase 3 of FIG. 4, the bandwidth that is agreed-upon dynamically from Phase 2 (e.g., the accepted new bandwidth offer) is configured over the cable network, by way of creating a gate and a corresponding DOCSIS service flow (also referred to as service flow or IP flow) using PCMM signaling. In PCMM, a gate is a logical representation of a policy decision that has been installed on CMTS 403. The gate is used to control access by a single IP flow to enhanced QoS services, such as the guaranteed bandwidth on-demand, provided by a DOCSIS cable network. The gate is unidirectional and controls access to a flow in either the upstream or downstream direction. A gate is created by a Gate-Set message (e.g., bandwidth configuration request). The Gate-Set message is used to initialize and modify gates, as well as to control and update the state of a gate on the CMTS 403. A service flow is the MAC-layer transport service that provides unidirectional flow of packets that are guaranteed a particular bandwidth. The service flow also shapes, polices, and prioritizes traffic according to the gate's traffic profile defined for the flow. For creation of the service flow, a second three-way handshake (e.g., between CMTS 403 and cable modem 404) takes place, using various DOCSIS dynamic service flow messages (e.g., DSA-REQ, DSA-RSP, and DSA-ACK (DSA=Dynamic Service Add)), described further below. Although the example shows creation of the gate and service flow in a sequence of separate steps, in other embodiments the gate and service flow may be created, reserved, and committed within the same step.

In the example, application manager 401 sends policy server 402 a bandwidth configuration request by way of a Gate-Set message to create a gate. Application manager 401 obtains QoS parameters for the Gate-Set message from the agreed-upon bandwidth from the accepted bandwidth offer. The Gate-Set message identifies the in-home subscriber (e.g., IP address of cable modem 404 or of a customer-premises equipment (CPE) device connected to cable modem 404, such as router 405) and contains a classifier, gate specification, and traffic profile parameters needed to achieve the requested QoS parameters.

In an embodiment, the classifier identifies the IP flow that will be mapped to the DOCSIS service flow associated with the gate. Gate specification describes high-level attributes of the gate and contains information regarding the treatment of objects specified in the gate message, such as prioritization for authorization or pre-authorization of a particular gate over other gates, direction of flow associated with the gate, time limitations for valid authorization prior to reserving or committing the resource associated with the gate, and so forth. In the situation where the agreed-upon bandwidth includes QoS parameters for both upstream and downstream directions, two gates share a single gate identifier (e.g., GateID) and are included in the Gate-Set message. In another embodiment, the upstream gate and downstream gate each corresponds to its own GateID (e.g., two separate GateIDs are used) and may be set in separate Gate-Set messages. The traffic profile of a gate defines its traffic characteristics (e.g., QoS traffic parameters), including the resource envelopes contained in the gate. Each resource envelope defines the type of resources (e.g., authorized, reserved, and/or committed) assigned to the service flow corresponding to the gate.

When policy server 402 receives the Gate-Set message from application manager 401, policy server 402 checks whether the application manager 401 is authorized to make such a request by applying predefined policies. For example, a policy may include limits on the number of gates allocated to a subscriber (e.g., an out-of-home subscriber associated with client device 406, or an in-home subscriber associated with router 405), limits on the types of QoS available to the subscriber, limits on which applications policy server 402 accepts, limits on the impact of service on a particular CMTS, among others. Upon passing all policy checks, policy server 402 determines the location of the subscriber (associated with cable modem 404 or CPE device connected to cable modem 404, such as router 405) and initiates a Gate-Set to CMTS 403 (e.g., the CMTS where the subscriber's cable modem 404 is connected).

At step 431, policy server 402 sends the Gate-Set message to CMTS 403. CMTS 403 checks whether policy server 402 is authorized to make such a request and whether the requested resources can be granted.

At step 432, if all of these checks are confirmed, CMTS 403 creates a gate, assigns it a gate identifier (e.g., GateID), and converts the bandwidth configuration request parameters to DOCSIS parameters. In some embodiments, a resource authorization envelope is included, comprising IP-level QoS parameters and classifiers defining the scope of the service flow that may be established (e.g., tested) against the gate. CMTS 403 may test the requested resource(s) against a provisioned authorization envelope to ensure that the request can be granted. For instance, if an authorized resource envelope is included, CMTS 403 signals the cable modem 404 to authorize service flow and may limit the amount of time the authorization remains valid. If a reserved resource envelope is included, CMTS 403 signals the service flow creation to cable modem 404 concerning admission of the resources. If a committed resource envelope is included, CMTS 403 signals the service flow creation to cable modem 404 concerning activation of the resources. If a resource authorization envelope is included (e.g., the requested level of bandwidth has been reserved for this gate), CMTS 403 signals the service flow creation to cable modem 404 for admission of such resources.

At steps 433, 435, and 436, a three-way handshake takes place between CMTS 403 and cable modem 404 to create and configure the DOCSIS resource. DOCSIS dynamic service flow messages are used for creation (and modification) of DOCSIS resources. Thus, service flow messages are exchanged during the three-way handshake between CMTS 403 and cable modem 404 to create the DOCSIS service flow, e.g., at steps 433 (DSA-REQ), 435 (DSA-RSP), and 436 (DSA-ACK). In an embodiment, the gate and service flow are created, reserved, and committed within the same step.

At step 437, CMTS 403 determines that the creation of the gate and service flow are successful and notifies policy server 402 via a Gate-Set Acknowledgement message. If the creation of the gate and/or service flow fails, CMTS 403 returns a Gate-Set Error message indicating the reason for failure.

At step 440, policy server 402 relays the status message to application manager 401. When application manager 401 receives the Gate-Set Acknowledgement message, the guaranteed bandwidth connection has been configured and the QoS resources are active. Confirmation is received from the DOCSIS domain that the flow with guaranteed bandwidth has been provisioned (e.g., using PCMM setup) to client device 406.

At step 441 in Phase 4 of FIG. 4, weighted fair queuing (WFQ), or other suitable allocation scheme, is implemented to ensure that guaranteed bandwidth is provisioned to client device 406 over the wireless domain. Policy server 402 sends a provisioning request (e.g., LAN bandwidth configuration request) to router 405 to ensure that client device 406 receives a share of radio resources proportional to the requested bandwidth (or as a fraction that is proportional to the requested bandwidth divided by maximum bandwidth capacity of the wireless link). For example, other devices may be connected to the LAN associated with router 405 besides the client device 406 of the out-of-home subscriber and have competing flows for bandwidth, such as wireless devices associated with the in-home subscriber to which router 405 belongs, or the wireless device of another out-of-home subscriber which is connected to the cable network via the hotspot of router 405 serving as an access point. Weights may be automatically assigned to competing flows based on the IP precedence (IPP) value in the IP header of packets of each flow. In an embodiment, the weight of a flow is inversely proportional to its IP precedence, such that more important packets have smaller virtual scheduling time and will be serialized faster.

At step 442, router 405 configures the LAN bandwidth over the wireless link based on WFQ, wherein router 405 distributes the wireless link's bandwidth among competing flows proportionally to their weights.

At step 443, router 405 sends an acknowledgement message to policy server 402 confirming guaranteed bandwidth configuration and allocation over the wireless link, which completes configuration of dynamic bandwidth SLA over the cable network and Wi-Fi.

At step 444, policy server 402 passes the configuration acknowledgment to application manager 401.

At step 445, application manager provisions the client device with the guaranteed bandwidth over the cable network accordingly.

In an embodiment, when the time period has expired or nears expiry, the system iterates through the process (e.g., Phases 1-4) until, for example, the client device 406 ends the process, an agreement between client device 406 and orchestrator 301 for a guaranteed bandwidth can no longer be reached, the available bandwidth of the cable network and Wi-Fi is limited or has fallen under a threshold value, and so forth. In each iteration, the system aims to meet the target bandwidth SLA, while adjusting to traffic conditions. For instance, client device 406 may be provisioned on-demand guaranteed bandwidth for 15 minutes. When the session expires or is about to expire, orchestrator 301 instructs for another a speed test of the wireless link, the available bandwidth of the DOCSIS and wireless links are evaluated in light of the target SLA requested for the second session, and a new bandwidth offer is generated for client device 406.

For example, in the subsequent iteration of Phase 1, parameters of the bandwidth request (e.g., upstream and/or downstream speeds, time period for provisioning resources, etc.) are received and the quality of the wireless link is reevaluated. In one embodiment, application manager 401 may use the updated target SLA from the bandwidth request of the previous session (e.g., the lower of the original target SLA or the speed test value of the first session) as the parameters for the next session. In another embodiment, application manager 401 uses the bandwidth that was negotiated and actually provisioned in the previous session as the target SLA for the next session. In yet another embodiment, all parameters are reset, and the original target SLA parameters are used in the bandwidth request for the next session. A speed test is conducted to determine any changes in the wireless link bandwidth. If the speed test results are lower than the target SLA, the target SLA values in the bandwidth request will be replaced by the speed test values. In some embodiments, application manager 401 may also provide navigation information to client device 406 to improve received signal strength based on RSSI and/or AoA data of the wireless signal to client device 406.

In the subsequent iteration of Phase 2, policy server 402 and client device 406 renegotiate the parameters of the bandwidth request by way of a three-way handshake. Policy server 402 reevaluates the links of both domains and recalculates whether the target SLA bandwidth (or the maximum wireless link bandwidth, whichever is lower) can be achieved. If the policy server 402 determines that the target SLA cannot be provided over either of the links (for instance, because the available bandwidth of at least one of the links is less than the target SLA), policy server 402 generates a new bandwidth offer with the new parameters. In some embodiments, other parameters of the bandwidth request may be renegotiated, such as the time period. If client device 406 accepts the new offer, application manager 401 proceeds to reconfigure the DOCSIS and Wi-Fi networks to provision end-to-end bandwidth according to the new parameters.

In the subsequent iteration of Phase 3, application manager 401 reconfigures the DOCSIS link to provision the updated agreed-upon bandwidth using another three-way handshake (e.g., between CMTS 403 and cable modem 404). Because the DOCSIS link has already been provisioned (e.g., using PCMM) in the previous session, CMTS 403 reconfigures the DOCSIS link using a Dynamic Service Change (DSC) three-way handshake (e.g., using DSC-REQ, DSC-RSP, and DSC-ACK dynamic service flow messages).

In the subsequent iteration of Phase 4, application manager 401 reconfigures the wireless link to provision the updated agreed-upon bandwidth, by adjusting weights in the WFQ algorithm (or other suitable resource allocation scheme), so that client device 406 can continue to use the wireless access point (e.g., router 405) connection with the same or altered parameters.

In an embodiment, a client device (e.g., client device 406) that is provisioned for guaranteed Wi-Fi and DOCSIS bandwidth for a time period is treated as a protected user of the system. New users that arrive at the same hotspot (e.g., connect to the same cable network via router 405 serving as an access point) may also be provisioned bandwidth, if available. In one embodiment, orchestrator 301 may refuse new connections (e.g., new requests for on-demand guaranteed bandwidth connections) during the time period (e.g., during guaranteed bandwidth provision of the current session for client device 406) when the available capacity on either the DOCSIS link and/or wireless link is low (e.g., at or below a certain threshold). In another embodiment, orchestrator 301 may upgrade or downgrade bandwidth for client device 406 during the time period (e.g., for a current session) or at the expiry of each time period, and/or reserve an unallocated proportion of bandwidth during the time period, based on an estimation of potential additional connection requests for the time period. Orchestrator 301 may estimate the number of potential additional connection requests and/or level of QoS in the requests based on various factors, such as historical rate receiving new connection requests or other traffic patterns over time. In yet another embodiment, orchestrator 301 downgrades the bandwidth of one or more existing users (being provisioned on-demand guaranteed bandwidth) on the arrival of a new user that requests on-demand guaranteed bandwidth connection. Policies concerning whether to downgrade bandwidth for a current user upon receiving a connection request from a new user can depend on terms of service in each user's subscription with the cable service provider (for example, different tiers of service, etc.).

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts, system sequence diagrams, or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving, from a device, a bandwidth request for a target service level agreement (SLA) bandwidth, the target SLA bandwidth to be provisioned over a first network link of a first domain and a second network link of a second domain;
coordinating operations between the first domain and the second domain;
calculating a first available bandwidth over the first network link;
calculating a second available bandwidth over the second network link;
in response to determining that at least one of the first available bandwidth or the second available bandwidth is lower than the target SLA bandwidth, configuring the first domain and the second domain to provision a negotiated bandwidth over the first network link and the second network link to the device;
provisioning the negotiated bandwidth over the first network link and the second network link for a first time period;
renegotiating the bandwidth request; and
reconfiguring the first domain and the second domain to provision a renegotiated bandwidth over the first network link and the second network link to the device for a second time period.

2. The method of claim 1, wherein the first domain comprises a Wi-Fi domain.

3. The method of claim 1, further comprising:
performing a speed test of the second network link; and
in response to determining that results of the speed test are lower than the target SLA bandwidth, replacing the target SLA bandwidth for both the first domain and the second domain with the results of the speed test.

4. The method of claim 1, wherein the negotiated bandwidth comprises a lower of the first available bandwidth or the second available bandwidth.

5. The method of claim 1:
wherein the first available bandwidth is calculated based on subtracting used capacity over the first network link from a first maximum bandwidth capacity associated with the first network link; and
wherein the second available bandwidth is calculated based on subtracting used capacity over the second network link from a second maximum bandwidth capacity associated with the second network link.

6. The method of claim 1:
wherein the first available bandwidth is further subtracted by a first bandwidth proportion, the first bandwidth proportion comprising an unallocated proportion of bandwidth of the first network link reserved for provisioning a second device; and
wherein the second available bandwidth is further subtracted by a second bandwidth proportion, the second bandwidth proportion comprising an unallocated proportion of bandwidth of the second network link reserved for provisioning the second device.

7. The method of claim 1, wherein the negotiated bandwidth is negotiated using PacketCable Multimedia (PCMM) protocol.

8. The method of claim 1, wherein the first domain is configured to provision the negotiated bandwidth over the first network link using PCMM protocol.

9. The method of claim 1, wherein the second domain is configured to provision the negotiated bandwidth over the second network link using weighted fair queuing (WFQ).

10. The method of claim 1, further comprising:
receiving, from the device, a received signal strength indicator (RSSI) associated with a network signal transmitted over the second network link to the device; and in response to determining that the RSSI is below a threshold, sending, to the device, a notification to relocate the device to increase the RSSI.

11. The method of claim 1, wherein the coordinating the operations of each domain, the calculating the first available bandwidth and the second available bandwidth, and the configuring the first domain and the second domain to provision the negotiated bandwidth are performed by a unified orchestrator.

12. The method of claim 1:

wherein the calculating the first available bandwidth and configuring the first domain to provision the negotiated bandwidth over the first network link are performed by a first sub-orchestrator associated with the first domain;

wherein the calculating the second available bandwidth and configuring the second domain to provision the negotiated bandwidth over the second network link are performed by a second sub-orchestrator associated with the second domain; and wherein the first sub-orchestrator and the second sub-orchestrator coordinate operations of their respective domains with each other.

13. A system comprising:

input/output circuitry configured to:

receive, from a device, a bandwidth request for a target service level agreement (SLA) bandwidth, the target SLA bandwidth to be provisioned over a first network link of a first domain and a second network link of a second domain; and control circuitry configured to:

coordinate operations between the first domain and the second domain;

calculate a first available bandwidth over the first network link;

calculate a second available bandwidth over the second network link;

in response to determining that at least one of the first available bandwidth or the second available bandwidth is lower than the target SLA bandwidth, configure the first domain and the second domain to provision a negotiated bandwidth over the first network link and the second network link to the device;

provision the negotiated bandwidth over the first network link and the second network link for a first time period;

renegotiate the bandwidth request; and reconfigure the first domain and the second domain to provision a renegotiated bandwidth over the first network link and the second network link to the device for a second time period.

14. The system of claim 13, wherein the first domain comprises a Wi-Fi domain.

15. The system of claim 13, wherein the control circuitry is further configured to:

perform a speed test of the second network link; and in response to determining that results of the speed test are lower than the target SLA bandwidth, replace the target SLA bandwidth for both the first domain and the second domain with the results of the speed test.

16. The system of claim 13, wherein the negotiated bandwidth comprises a lower of the first available bandwidth or the second available bandwidth.

17. The system of claim 13:

wherein the first available bandwidth is calculated based on subtracting used capacity over the first network link from a first maximum bandwidth capacity associated with the first network link; and wherein the second available bandwidth is calculated based on subtracting used capacity over the second network link from a second maximum bandwidth capacity associated with the second network link.

18. The system of claim 17:

wherein the first available bandwidth is further subtracted by a first bandwidth proportion, the first bandwidth proportion comprising an unallocated proportion of bandwidth of the first network link reserved for provisioning a second device; and wherein the second available bandwidth is further subtracted by a second bandwidth proportion, the second bandwidth proportion comprising an unallocated proportion of bandwidth of the second network link reserved for provisioning the second device.

19. The system of claim 13, wherein the negotiated bandwidth is negotiated using PacketCable Multimedia (PCMM) protocol.

* * * * *